(12) United States Patent
Lindqvist et al.

(10) Patent No.: US 10,136,274 B2
(45) Date of Patent: Nov. 20, 2018

(54) METHOD AND APPARATUS FOR GENERATING AN INDICATION OF REMAINING BATTERY LIFE FOR A WIRELESS DEVICE

(71) Applicant: Telefonaktiebolaget LM Ericsson (publ), Stockholm (SE)

(72) Inventors: Fredrik Lindqvist, Stockholm (SE); Niklas Johansson, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/570,058

(22) PCT Filed: Apr. 30, 2015

(86) PCT No.: PCT/EP2015/059597
§ 371 (c)(1),
(2) Date: Oct. 27, 2017

(87) PCT Pub. No.: WO2016/173676
PCT Pub. Date: Nov. 3, 2016

(65) Prior Publication Data
US 2018/0115879 A1    Apr. 26, 2018

(51) Int. Cl.
*H04W 4/20* (2018.01)
*H04W 52/02* (2009.01)
(Continued)

(52) U.S. Cl.
CPC ............ *H04W 4/20* (2013.01); *H04B 17/309* (2015.01); *H04W 24/08* (2013.01);
(Continued)

(58) Field of Classification Search
CPC .............................................. H04W 52/0261
See application file for complete search history.

(56) References Cited

U.S. PATENT DOCUMENTS 6,087,808 A * 7/2000 Pritchard ........... G01R 31/3651
320/132
8,743,758 B1    6/2014 Bhargava et al.
(Continued)

FOREIGN PATENT DOCUMENTS

WO    2015012654 A1    1/2015

OTHER PUBLICATIONS

Asadi, Arash et al., "A Survey on Device-to-Device Communication in Cellular Networks", IEEE Communications Surveys & Tutorials, vol. 16, Issue: 4, Apr. 24, 2014, 1801-1819.

*Primary Examiner* — Hsin-Chun Liao
(74) *Attorney, Agent, or Firm* — Murphy, Bilak & Homiller, PLLC

(57) ABSTRACT

A method (100) for generating an indication of remaining battery life for a wireless device is disclosed. The wireless device is positioned in an installation location and operable for radio communication with a communication network node. The method comprises estimating a signal loss between the wireless device in the installation location and the communication network node (120) and mapping the estimated signal loss to an indication of remaining battery life for the wireless device (130). The mapping is based on remaining battery capacity for the wireless device and estimated energy consumption of the wireless device for radio communication, the estimated energy consumption being generated from the estimated signal loss and determined communication parameters for the wireless device. Also disclosed are an apparatus (300, 400) for generating an indication of remaining battery life for a wireless device and a computer program product configured to carry out a method for generating an indication of remaining battery life for a wireless device.

36 Claims, 11 Drawing Sheets

(51) Int. Cl.
*H04B 17/309* (2015.01)
*H04W 24/08* (2009.01)
(52) U.S. Cl.
CPC ... *H04W 52/0229* (2013.01); *H04W 52/0245* (2013.01); *H04W 52/0261* (2013.01); *Y02D 70/1262* (2018.01); *Y02D 70/21* (2018.01); *Y02D 70/25* (2018.01)

(56) References Cited

U.S. PATENT DOCUMENTS

| | | | | |
|---|---|---|---|---|
| 2003/0174757 | A1* | 9/2003 | Partyka | H04B 1/713 375/132 |
| 2009/0325622 | A1* | 12/2009 | Matsumura | H04B 7/2606 455/522 |
| 2011/0294436 | A1 | 12/2011 | Ono et al. | |
| 2015/0338467 | A1* | 11/2015 | Liu | G01R 31/3624 702/63 |

* cited by examiner

METHOD AND APPARATUS FOR GENERATING AN INDICATION OF REMAINING BATTERY LIFE FOR A WIRELESS DEVICE

TECHNICAL FIELD

The present invention relates to a method and an apparatus for generating an indication of remaining battery life in a wireless device. The present invention also relates to a computer program product configured, when run on a computer, to carry out a method for generating an indication of remaining battery life in a wireless device.

BACKGROUND

The market for wireless devices has been in continual expansion as communication network architecture and services have developed and evolved over recent years. Uptake of Machine Type Communication (MTC) devices in particular is expected to grow rapidly in the coming years. MTC devices are wireless devices generally associated with equipment as opposed to a human user. Such devices typically include sensors, actuators or meters which are connected to the internet or a computer cloud via a communication network. For example, increasing numbers of residential and commercial buildings are being equipped with "Smart" electric, gas and water meters that are ale to periodically report energy, gas or water consumption without the need for a site visit from a technician.

In many cases, MTC devices will have a fixed installation location and will be battery powered, to allow for easier and more flexible installation. The desired operation time for a single battery or battery charge is typically several years, to avoid costly or inconvenient battery replacements or charging. Typical deployment scenarios for MTC devices are illustrated in FIGS. 1 and 2. Referring to FIG. 1, in a first example, an MTC device 2 may communicate directly with a local access point (AP) 4, or radio base station. For simplicity, both the local access point and radio base station are referred to as AP in the following discussion, and the deployment is known as a device-to-AP (D2AP) installation. Referring to FIG. 2, in another example, the MTC device 2 may communicate directly with another device 6, which may be a Smartphone or another MTC device. The second device 6, known as a master device, may communicate with another network node such as an AP 4. This deployment is known as a device-to-device (D2D) installation.

In either of the illustrated installations, communication network traffic is often characterised by small amounts of data, of the order of a few bytes, transmitted or received relatively infrequently. In order to compete with other short range radio transceivers, and to preserve battery life, MTC devices are generally designed to be simple and low cost, stripped of costly power consuming auxiliary features found on more advanced wireless devices, and providing only the minimum functionality to enable transmission of the relevant information to the network.

Guidance for MTC device installation is generally limited to basic rules of thumb covering location and direction of antennas for best signal reception. Such rules of thumb may be that the antenna should be pointing upward, and the device should be close to a window. This guidance is relatively basic, particularly considering that for devices having a fixed installation, installation location may affect the power required for radio communication during the lifetime of the device, and hence may impact the battery life of the device.

An additional difficulty surrounding battery lifetime for wireless devices, and in particular MTC devices, is the need to manage battery replacement. For devices which may have a battery lifetime extending several years, it is helpful to inform a suitable person, for example a customer or user of the device, or a network or service provider, when it is nearing time to replace the battery, in order to avoid unnecessary down time. Remaining battery life in cellular communication devices like Smartphones is typically computed solely based on average power consumption since the start of the device or since its last charge. The average power consumption is estimated, and used together with the current charge level to estimate the remaining battery lifetime. A problem with predicting future battery life based on power consumed so far in a device is that a body of historical usage data is required to make any kind of prediction as to future usage. At installation time, when the programming of battery replacement might be contemplated, insufficient data will be available for accurate prediction. For example, if a gas meter reports gas consumption once per day, several days of communication would be needed before even a rough estimate of the power consumption, and hence battery, could be predicted.

SUMMARY

It is an aim of the present invention to provide a method and apparatus which obviate or reduce at least one or more of the disadvantages mentioned above.

According to a first aspect of the present invention, there is provided a method for generating an indication of remaining battery life for a wireless device, the wireless device being positioned in an installation location and operable for radio communication with a communication network node. The method comprises estimating a signal loss between the wireless device in the installation location and the communication network node and mapping the estimated signal loss to an indication of remaining battery life for the wireless device. The mapping is based on estimated energy consumption of the wireless device for radio communication, the estimated energy consumption being generated from the estimated signal loss and determined communication parameters for the wireless device. The mapping is also based on remaining battery capacity for the wireless device.

According to examples of the invention, the signal loss may be a path loss or may be a coupling loss, which may include both path loss and antenna losses.

According to examples of the invention, the indication of remaining battery life may be a calculated remaining battery life or may be an indicator of remaining battery life, for example a text or numerical indicator selected from a scale. According to further examples of the invention, the determined communication parameters may be predetermined communication parameters which may for example be hard coded into one or more apparatus on which the method may be conducted. Alternatively, the determined communication parameters may be estimated or determined during performance of the method or may be received from example from a communication network node.

According to examples of the invention, one or more of the method steps may be performed in the wireless device and/or in the communication network node and/or in another communication network node. The communication network node may be a basestation, a local access point or may be another wireless device.

According to examples of the invention, estimating a signal loss between the wireless device and the communication network node may comprise obtaining a transmitted signal power and a received signal power of signals sent between the wireless device and the communication network node, and calculating a signal loss based on the obtained transmitted and received signal powers.

According to examples of the invention, the signals may comprise at least one of uplink and/or downlink pilot signals. According to examples of the invention, if the obtained transmitted and received signal powers are measured in dB then calculating the signal loss may comprise calculating a difference between the transmitted and received signal powers. If the obtained transmitted and received signal powers are measured in a linear scale such as Watts, calculating the signal loss may comprise calculating a ratio of the received and transmitted signal powers.

According to examples of the invention, obtaining a signal power may comprise at least one of measuring a signal power, retrieving a signal power from memory and/or receiving a signal power.

According to examples of the invention, a signal power may be a measured signal power received from the entity receiving signals, or could be received from a communication network node having knowledge of the signal power.

According to examples of the invention, the signals may be at least one of pilot signals or reference signals.

According to examples of the invention, the method may further comprise triggering the wireless device to send pilot signals to the communication network node.

According to examples of the invention, mapping the estimated signal loss to an indication of remaining battery life for the wireless device may comprise consulting a database. The database may have been populated by, for a plurality of different estimated signal losses: estimating an energy consumption of the wireless device per unit time for radio communication from the estimated signal loss and determined communication parameters for the wireless device; assuming a remaining battery capacity for the wireless device; and calculating a remaining battery life from the retrieved battery capacity and the estimated energy consumption per unit time.

According to examples of the invention, assuming a remaining battery capacity for the wireless device may comprise using a maximum battery capacity for the wireless device, for example for use during installation of a new wireless device, the maximum capacity being that associated with a new battery.

According to examples of the invention, mapping the estimated signal loss to an indication of remaining battery life for the wireless device may comprise estimating an energy consumption of the wireless device per unit time for radio communication from the estimated signal loss and determined communication parameters for the wireless device; retrieving a remaining battery capacity for the wireless device; and calculating a remaining battery life from the retrieved battery capacity and the estimated energy consumption per unit time. According to some examples, the estimation of energy use and calculation of remaining battery life may therefore be conducted in real-time during the performance of the method.

According to examples of the invention, retrieving a remaining battery capacity may comprise checking by the wireless device for remaining battery capacity, and may additionally comprise receiving at the communication network node or another communication network node an indication of the remaining battery capacity, depending upon where the calculation of remaining battery life is taking place.

According to examples of the invention, the determined communication parameters for the wireless device may comprise at least one of an amount of data transmitted in messages from the wireless device, a frequency of occurrence of transmission of messages from the wireless device, an amount of data received in message received by the wireless device, a frequency of occurrence of receipt of messages by the wireless device, an amount of data in a control message, and/or a frequency of occurrence of control message signalling.

According to examples of the invention, any or all of the above mentioned parameters may be taken into account in estimating energy consumption, providing different levels of accuracy for the estimation.

According to examples of the invention, when the determined communication parameters for the wireless device comprise at least an amount of data transmitted in messages from the wireless device and a frequency of occurrence of transmission of messages from the wireless device; the determined communication parameters for the wireless device may further comprise at least one of receiver characteristics at the communication network node and/or power amplifier efficiency at the wireless device.

According to examples of the invention, calculating a remaining battery life may comprise dividing the remaining battery capacity by the estimated energy consumption per unit time.

According to examples of the invention, calculating a remaining battery life may further comprise estimating energy consumption of the wireless device per unit time for processing, combining the estimated energy consumption per unit time for processing with the estimated energy consumption per unit time for radio communication, and dividing the remaining battery capacity by the combined estimated energy consumption. According to examples of the invention, battery self discharge may also be taken into account in calculating a remaining battery life.

According to examples of the invention, the method may further comprise providing the generated indication of remaining battery life to at least one of a user, operator or installer of the wireless device.

According to examples of the invention, providing the generated indication of remaining battery life to at least one of a user, operator or installer of the wireless device may comprise displaying the indication on the wireless device itself, for example via a screen or illumination of one or more LEDs. Providing the generated indication of remaining battery life to at least one of a user, operator or installer of the wireless device may alternatively or additionally comprise sending the indication for display to a webpage or application for use on a Smartphone or tablet computer, or sending an SMS or email message. Alternatively, providing the generated indication of remaining battery life to at least one of a user, operator or installer of the wireless device may comprise sending a message (for example SMS or email) to the user, operator or installer, when the indication falls below a threshold.

According to examples of the invention, the method may further comprise determining that the generated indication of remaining battery life is below a threshold and modifying at least one of communication or frequency of occurrence of communication between the wireless and the communication network node to conserve energy in the wireless device battery.

According to examples of the invention, modifying communication may comprise switching to a slower, more energy saving mode of communication, or reducing the amount of information transmitted by the wireless device, for example by truncating bits describing a sensor measurement. Modifying communication may also include changes by the network, for example transmitting to the device using repetition and BPSK to reduce the load on the wireless device receiver, or making simpler requests to the device.

According to examples of the invention, modifying frequency of occurrence of communication may comprise reducing the frequency, or number of times within a given time interval, with which the wireless device communicates with the communication network node or with which the communication network node polls the wireless device for data.

According to examples of the invention, the wireless device may comprise a Machine Type Communication, MTC, device.

According to another aspect of the present invention, there is provided a computer program configured, wherein run on a computer or processor, to execute a method according to any one of the preceding claims.

According to another aspect of the present invention, there is provided a computer program product comprising computer readable material having stored thereon a computer program according to the second aspect of the present invention.

According to another aspect of the present invention, there is provided an apparatus for generating an indication of remaining battery life for a wireless device, the wireless device being positioned in an installation location and operable for radio communication with a communication network node. The apparatus comprises an estimating unit for estimating a signal loss between the wireless device in the installation location and the communication network node, and a mapping unit for mapping the estimated signal loss to an indication of remaining battery life for the wireless device. The mapping is based on estimated energy consumption of the wireless device for radio communication, the estimated energy consumption being generated from the estimated signal loss and determined communication parameters for the wireless device, and remaining battery capacity for the wireless device.

According to examples of the invention, the estimating unit may comprise a signal power unit for obtaining a transmitted signal power and a received signal power of signals sent between the wireless device and the communication network node, and a calculating unit for calculating a difference between the obtained transmitted and received signal powers.

According to examples of the invention, the signal power unit may be for performing at least one of measuring a signal power, retrieving a signal power from memory, and/or receiving a signal power.

According to examples of the invention, the signals may be at least one of pilot signals or reference signals.

According to examples of the invention, the apparatus may further comprise a trigger unit for triggering the wireless device to send pilot signals to the communication network node.

According to examples of the invention, the mapping unit may comprise a database unit for consulting a database, and the database may have been populated by, for a plurality of different estimated signal losses: estimating an energy consumption of the wireless device per unit time for radio communication from the estimated signal loss and determined communication parameters for the wireless device; assuming a remaining battery capacity for the wireless device; and calculating a remaining battery life from the retrieved battery capacity and the estimated energy consumption per unit time.

According to examples of the invention, the mapping unit may comprise an energy unit for estimating an energy consumption of the wireless device per unit time for radio communication from the estimated signal loss and determined communication parameters for the wireless device and a battery capacity unit for retrieving a remaining battery capacity for the wireless device. The mapping unit may also comprise a battery life unit for calculating a remaining battery life from the retrieved battery capacity and the estimated energy consumption per unit time.

According to examples of the invention, the determined communication parameters for the wireless device may comprise at least one of an amount of data transmitted in messages from the wireless device, a frequency of occurrence of transmission of messages from the wireless device, an amount of data received in message received by the wireless device, a frequency of occurrence of receipt of messages by the wireless device, an amount of data in a control message, and/or a frequency of occurrence of control message signalling.

According to examples of the invention, when the determined communication parameters for the wireless device comprise at least an amount of data transmitted in messages from the wireless device and a frequency of occurrence of transmission of messages from the wireless device; the determined communication parameters for the wireless device may further comprise at least one of receiver characteristics at the communication network node and/or power amplifier efficiency at the wireless device.

According to examples of the invention, the battery life unit may be for calculating a remaining battery life by dividing the remaining battery capacity by the estimated energy consumption per unit time.

According to examples of the invention, the battery life unit may be for calculating a remaining battery life by also estimating energy consumption of the wireless device per unit time for processing, combining the estimated energy consumption per unit time for processing with the estimated energy consumption per unit time for radio communication, and dividing the remaining battery capacity by the combined estimated energy consumption.

According to examples of the invention, the apparatus may further comprise a feedback unit for providing the generated indication of remaining battery life to at least one of a user, operator or installer of the wireless device.

According to examples of the invention, the apparatus may further comprise a checking unit for determining that the generated indication of remaining battery life is below a threshold, and a low battery unit for modifying at least one of communication or frequency of occurrence of communication between the wireless and the communication network node to conserve energy in the wireless device battery.

According to examples of the invention, the wireless device may comprise a Machine Type Communication, MTC, device.

According to examples of the invention, the apparatus may be distributed between a wireless device and a communication network node. According to examples of the invention, the network node may be a basestation, a local access point, or any other communication node. The wireless device may be one or both of the wireless device for which a remaining battery life indication is being generated or a master wireless device with which the subject wireless device communicates.

According to another aspect of the present invention, there is provided a wireless device comprising apparatus according to the fourth aspect of the present invention. The wireless device may be an MTC device.

According to another aspect of the present invention, there is provided a communication network node comprising apparatus according to the fourth aspect of the present invention.

According to another aspect of the present invention, there is provided an apparatus for generating an indication of remaining battery life for a wireless device, the wireless device being positioned in an installation location and operable for radio communication with a communication network node. The apparatus comprises a processor and a memory, the memory containing instructions executable by the processor, such that the apparatus is operable to estimate a signal loss between the wireless device in the installation location and the communication network node, and map the estimated signal loss to an indication of remaining battery life for the wireless device. The mapping is based on estimated energy consumption of the wireless device for radio communication, the estimated energy consumption being generated from the estimated signal loss and determined communication parameters for the wireless device, and remaining battery capacity for the wireless device.

BRIEF DESCRIPTION OF THE DRAWINGS

For a better understanding of the present invention, and to show more clearly how it may be carried into effect, reference will now be made, by way of example, to the following drawings in which.

DETAILED DESCRIPTION

Aspects of the present invention provide a method and apparatus for generating an indication of remaining battery life for a wireless device. The battery life of a wireless device, such as an MTC device, may be dependent on a range of factors, including the energy capacity of the battery, the power consumed by applications and processing in the device, and the transmission power and transmission time for radio communication. Power consumption for radio communication increases as network coverage worsens, and in poor coverage areas, such as indoors, in basements, and underground, battery life may be significantly governed by radio communication power consumption.

The amount of energy needed for transmitting or receiving a data packet is dependent upon the power used for transmission or reception of the packet, and on the time duration for the transmission or reception. These factors are in turn determined by the signal loss to the other node in the communication link. A high signal loss means more transmission power and longer transmission time for each bit of information.

By estimating the signal loss for a wireless device in a given installation location, aspects of the present invention enable the generation of an indication of remaining battery life by mapping the estimated signal loss to remaining battery life. The mapping is based upon remaining battery capacity for the device and on an estimated energy consumption of the device for radio communication, generated from the estimated signal loss. In some examples of the invention, an indicator of remaining battery life can be generated in a potential installation location, and can be used to guide device installation, identifying the location having the least signal loss, and hence longest battery life. In addition, aspects of the invention may also be used to predict battery life after installation, potentially in combination with traditional methods of estimating historical power consumption, to more accurately predict future battery life, which can be used to plan battery replacement and/or charging.

Figure 1:
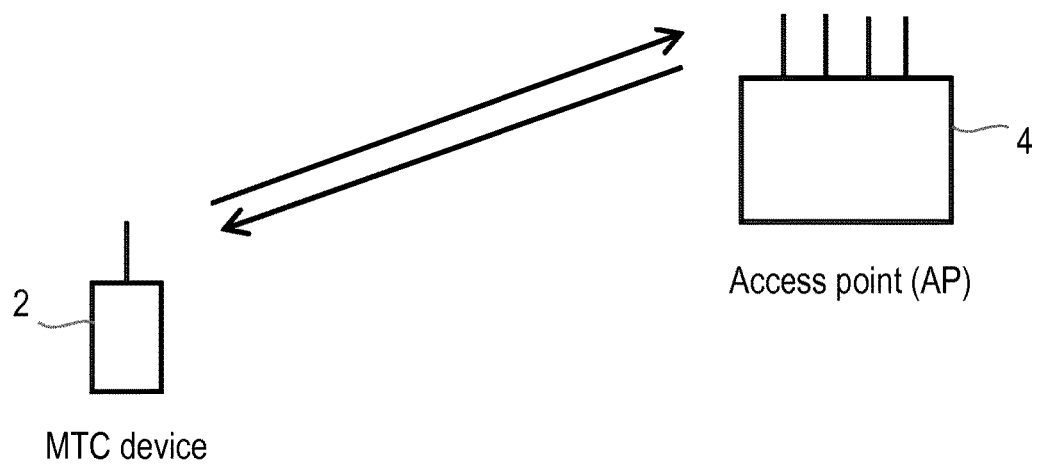
FIG. 1 illustrates an MTC device communicating directly with an Access Point.
Figure 2:
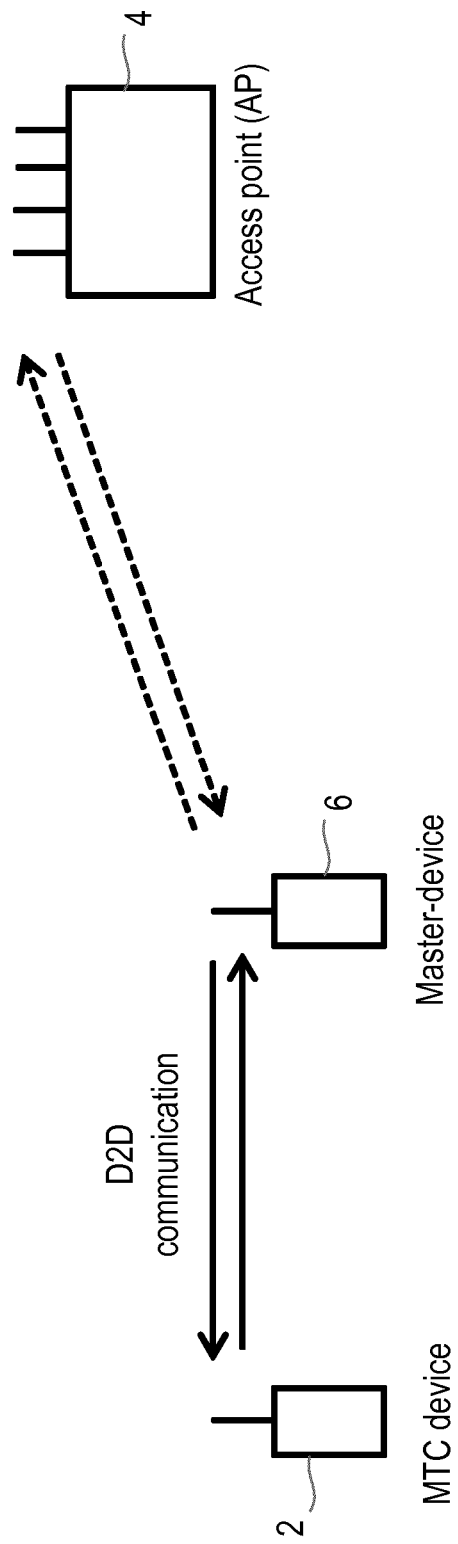
FIG. 2 illustrates an MTC device communicating with an Access Point via a Master MTC device.
Figure 3:
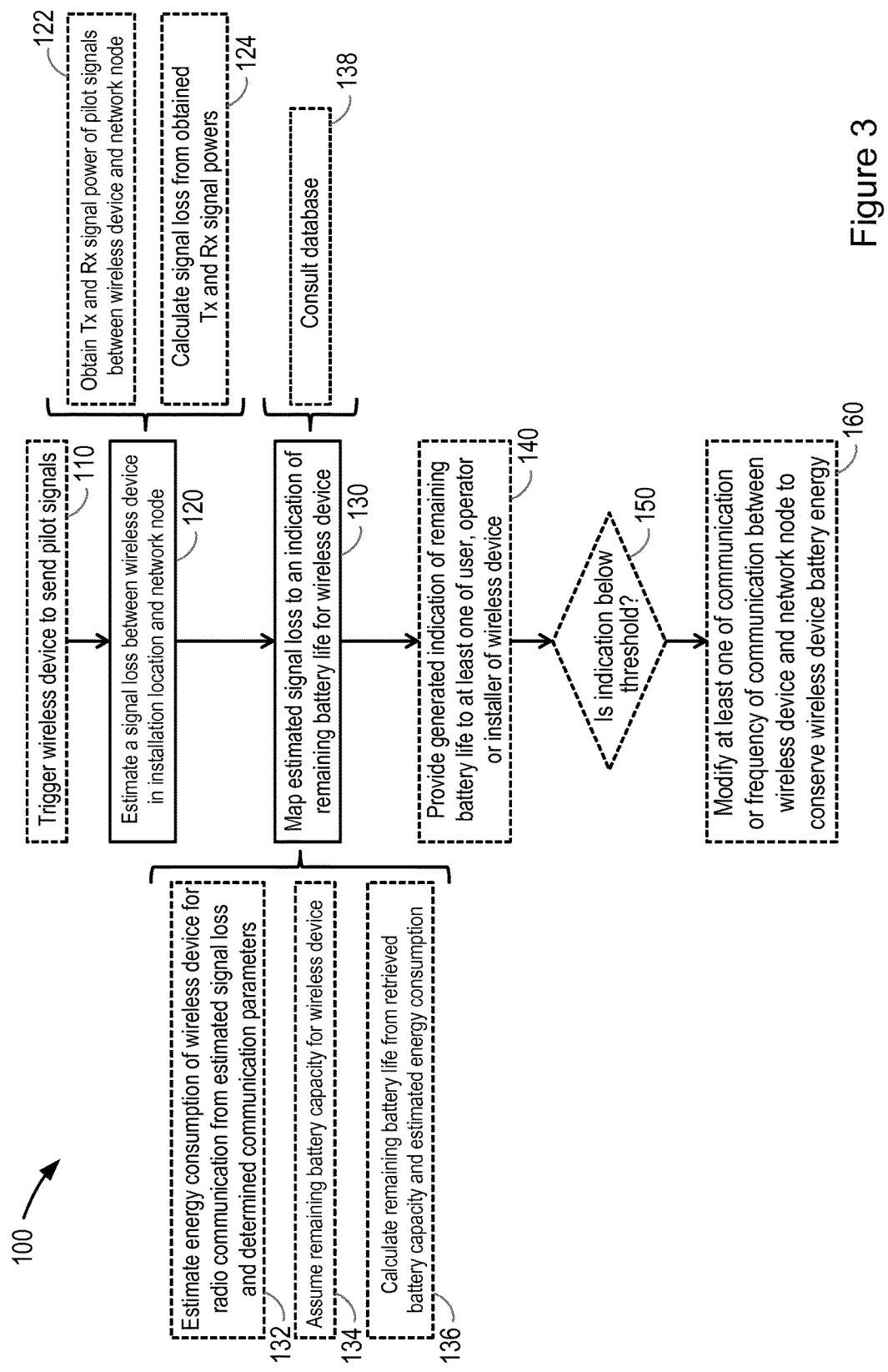
FIG. 3 is a flow chart illustrating process steps in a method for generating an indication of remaining battery life for a wireless device.

FIG. 3 illustrates process steps in a first example method 100 for generating an indication of remaining battery life in a wireless device, the wireless device being positioned in an installation location and operable for radio communication with a communication network node such as a basestation, access point or master wireless device. The wireless device may be an MTC device, or may be some other type of wireless device. The method may be conducted in the wireless device, or in the communication network node. In some examples, the method steps may be shared between the wireless device and one or more communication network nodes. The essential steps of the method include step 120, in which signal loss between the wireless device in the installation location and the communication network node is estimated, and step 130, in which the estimated signal loss is mapped to an indication of remaining battery life for the wireless device. The mapping performed in step 130 is based on remaining battery capacity for the wireless device and on estimated energy consumption of the wireless device for radio communication, the estimated energy consumption being generated from the estimated signal loss and determined communication parameters for the wireless device.

In some examples of the method 100, the estimating step 120 may be preceded by a step 110 in which the wireless device is triggered to send pilot signals. Both uplink pilot signals from the wireless device and downlink pilot signals from the communication network node may then be available for use in estimating signal loss between the wireless device and the network node. In some examples, uplink transmission power may be greater than that required for receiving downlink transmissions, and uplink transmission power may therefore be the most significant factor in determining battery life. While a communication network node such as a basestation may transmit pilot signals regularly, the wireless device may transmit such signals much less regularly. Triggering the wireless device to transmit uplink pilot signals may thus enable uplink signal loss to be calculated, providing a more accurate indication of remaining battery life than if only downlink signal loss is calculated. Triggering transmission of uplink pilot signals may for example comprise placing the wireless device into an installation or testing mode.

The step 120 of estimating signal loss between the wireless device and the network node may comprise estimating a path loss between the wireless device and the network node. In further examples, step 120 may comprise estimating a coupling loss, including both the path loss between the wireless device and the network node and antenna losses at the wireless device and network node. The step 120 of estimating signal loss may comprise a first sub step 122 of obtaining Transmitted and Received signal powers of signals between the wireless device and the network node. The signals may be pilot signals or reference signals, for example triggered in step 110. In other examples, the Transmitted and Received signal powers may be Total Received and Transmitted signal powers. Depending upon where the estimation of signal loss takes place, and whether uplink, downlink or both signal losses are estimated, obtaining transmitted and received signal powers may comprise retrieving a known signal power, or receiving a signal power from another entity. For example, the wireless device will be in possession of the transmitted signal power for its uplink pilot or other signals, but will receive the received signal power for those uplink signals from the network node. Other combinations may be envisaged, as discussed in further detail below with reference to FIG. 5. In a second sub step 124, the step 120 of estimating signal loss may comprise calculating a signal loss from the obtained received and transmitted signal powers. If the signal powers are measured in decibels, this may comprise calculating a difference between the received and transmitted signal powers. If the powers are measured in a linear scale such as watts, this may comprise calculating a ratio.

Having estimated the signal loss between the wireless device and the network node in step 120, the method proceeds to map the estimated signal loss to an indication of remaining battery life for the wireless device in step 130. In one example of the method, this may comprise conducting real time calculations to perform the mapping. In another example, calculations may have been performed in advance and used to populate a database or look-up table, enabling the real time mapping step to be conducted by simply consulting the database or lookup table. Both examples are discussed in further detail below.

According to the first of the above discussed examples, the mapping step 130 comprises real time calculation in sub steps 132, 134 and 136. In a first sub step 132, an estimate is made of the energy consumption of the wireless device for radio communication. This estimation is made on the basis of the estimated signal loss and determined communication parameters. The communication parameters may be determined in advance, for example by a network operator, or may be determined in real time by the entity conducting the method step. The communication parameters may include an amount of data transmitted in messages from the wireless device or received in messages to the wireless device, as well as an amount of data in control messages. The frequency of occurrence of transmission of messages, receipt of messages and control message signalling may also be included in the determined communication parameters. The combination of the amount of data transmitted or received and how often such data is transmitted or received may allow an estimation of the power required for radio communication. In a second sub step 134, a remaining battery capacity for the wireless device is assumed. If this sub step is performed in the wireless device, then the wireless device may retrieve its actual remaining battery capacity. In other examples in which this sub step is not performed in the wireless device, the wireless device may provide its actual remaining battery capacity to the communication network node or other entity conducting the sub step. In still further examples, it may be assumed that the wireless device is being installed, and so the wireless device battery has its full capacity, which may be known within the communication network and provided to the appropriate network node. In a third sub step 136, the remaining battery life is calculated from the remaining battery capacity and the estimated energy consumption.

According to the second of the above discussed examples, the calculations discussed above may be performed ahead of time, on the basis of prior knowledge of the communication parameters for the wireless device. Such knowledge may enable the estimation of power consumption for different possible signal losses, and hence estimation of remaining battery life for different signal losses, and different maximum or remaining battery capacities. These calculations may be used to populate a database which may be consulted in sub step 138, enabling a direct mapping from the estimated signal loss to an indication of remaining battery life for the wireless device. In some examples, the indication may be an actual estimate of the remaining battery life. In other examples, a scale may be used, including for example a numerical scale, to indicate the approximate remaining battery life for the wireless device.

In step 142, the method 100 may comprise providing the generated indication of remaining battery life to at least one of a user, operator or installer of the wireless device. This may be performed in a range of different ways, depending upon the display options available at the wireless device and the particular example of the invention. For example, an LED display on the wireless device may be used to display the battery life indication. Alternatively, the indication of remaining battery life may be sent in an email or SMS message to a Smartphone or computer, or may be displayed on a webpage. The provided indication may allow a user, operator or installer to take appropriate action, such as programming a battery replacement when remaining battery life is getting low, or trying another installation location, until the location permitting the longest remaining battery life is found.

The method 100 may additionally include a step 150 of checking whether or not the indication is below a threshold, which may for example be associated with a minimum remaining battery life. The threshold may for example be set at 5%, 10%, 20% or another level representing a low amount of remaining battery life. If the indication is found to be below the threshold in step 150, the method 100 may comprise modifying at least one of communication or frequency of occurrence of communication between the wireless device and the network node, in order to conserve wireless device battery energy. This step may for example comprise switching to a slower, more energy saving mode of communication, or reducing the amount of information transmitted by the MTC device, for example by truncating bits describing a sensor measurement. Modifying communication may also include changes by the network, for example transmitting to the device using repetition and BPSK to reduce the load on the MTC device receiver, or making simpler requests to the device. In further examples, the network may poll the wireless device for information less often, or the wireless device itself may initiate communication with the network less often.

As discussed above, the wireless device may be an MTC device, and the signal loss estimated may be a coupling loss, including both path loss and antenna losses. One application for the above discussed method is during MTC device installation, as a guide to the identification of a suitable installation location for the MTC device. According to examples of the invention, during MTC device installation, or more generally when the device accesses the communication network by communicating with the communication network node (basestation, access point or master device), the communication network node may estimate the coupling loss. The coupling loss information may then be used by the communication network node to predict the remaining battery lifetime. The predicted battery lifetime may then be transferred to the MTC device installer, customer or user by any established means of communication, for example via SMS, email, social media networks, or simply shown in real time on a webpage provided by the network operator. In alternative examples, the estimation of coupling loss and/or estimation of battery life based on the coupling loss, can be performed in the MTC device. The MTC device may also by itself indicate to the installer or user the predicted battery life, for example via a screen or LED display. In a D2D scenario, involving a master MTC device, the master device may estimate coupling loss between the master device and the MTC device, and convey the estimated coupling loss to a basestation or access point for mapping to an indication of remaining battery life, which indication is then presented to the user as discussed above.

Another application for the above discussed method is to provide a real time prediction of remaining battery life throughout the lifetime of the MTC device, which prediction may update in the light of changes affecting the MTC device. Many MTC devices have a deterministic traffic pattern, and while others may have more complex traffic patterns, such patterns are in general more predictable than human-operated devices such as Smartphones in which the traffic pattern is dependent upon human behavior. This means that the communication parameters for MTC devices, including message size and frequency of occurrence of message transmission and receipt, may be known with reasonable accuracy. However, traffic patterns may change in light of updates to MTC device programming, and such changes may affect the predicted battery life. In addition to changes in traffic pattern, other changes may affect the power required for radio communication in the MTC device, and hence remaining battery life. For example, if the device is moved locally, or if the network is updated so that the device starts to connect to new network nodes with different radio communication performance, this may affect the radio communication power usage. A local access point, basestation or a D2D master device that the MTC device communicates with may be removed, or an additional base station may be added to the cellular network. The method 100 discussed above allows for an indication of remaining battery life reflect such changes in network configuration or traffic pattern, so facilitating accurate scheduling of battery replacement or changing.

FIGS. 4 to 10 illustrate another example method 200 according to an aspect of the present invention. The method 200 illustrates one way in which the functionality and method steps of the method 100 may be enhanced and supplemented to provide the above discussed and additional functionality. The method 200 uses the example of an MTC device in a D2AP scenario, that is where the MTC device communicates directly with a basestation or access point. This example also applies to D2D scenarios in which the master device implements the full functionality of the communication network node. In further D2D scenarios, the functionality of the communication network node may be shared between a master device and an access point or basestation. Such scenarios are discussed briefly below, following the explanation of the example method 200. It will be appreciated that functionality attributed below to "the communication network" or to "the network" may reside in the communication network node (being a basestation, access point or master device), or in the MTC device, or in another node in the communication network.

Figure 4:
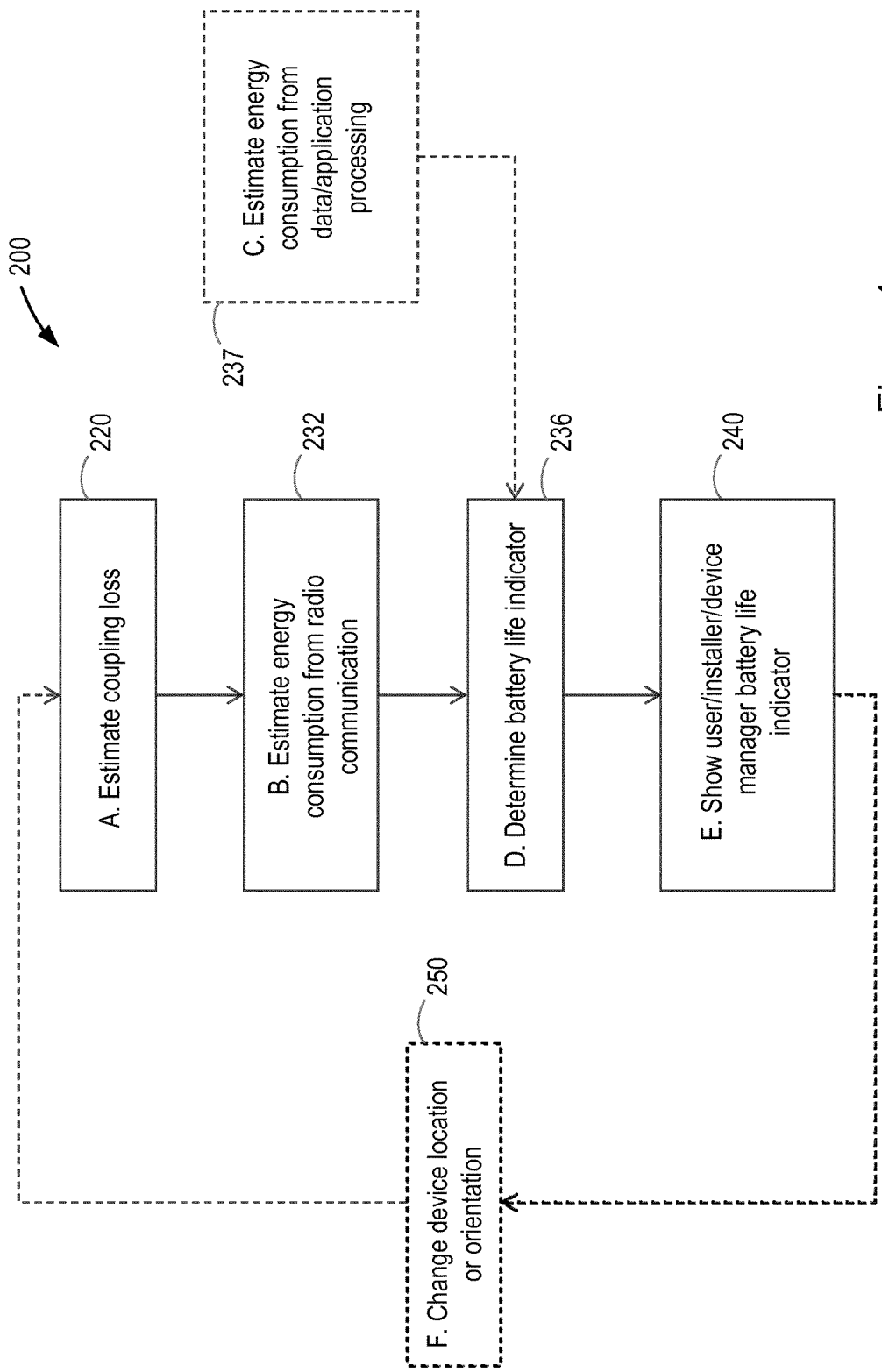
FIG. 4 is a flow chart illustrating process steps in another example of a method for generating an indication of remaining battery life for a wireless device.

FIG. 4 is a flow chart illustrating an overview of the method 200 including two alternative applications of the method. In a first alternative, targeting installation guidance for the MTC device, the method comprises steps 220, 232, 236, 240 and 250. In a second alternative, targeting prediction or reporting of remaining battery life, the method comprises steps 220, 232, 236, 237 and 240. For both installation guidance and battery life prediction, first the coupling loss between the MTC device in its current installation location and the communication network node with which it communicates is estimated in step 220. This estimate is then mapped to an indication of remaining battery life in steps 232 and 236. For accurate prediction of remaining battery life, this can be complemented with estimates of the energy consumption required for data processing and application execution in the device at step 237. This energy consumption is not typically dependent on the radio environment and so may be omitted for the purposes of installation guidance. The indication of battery life is then presented to a user, installer or operator in step 240, who may act on the indication, for example by changing a device installation location in step 250.

Figure 5:
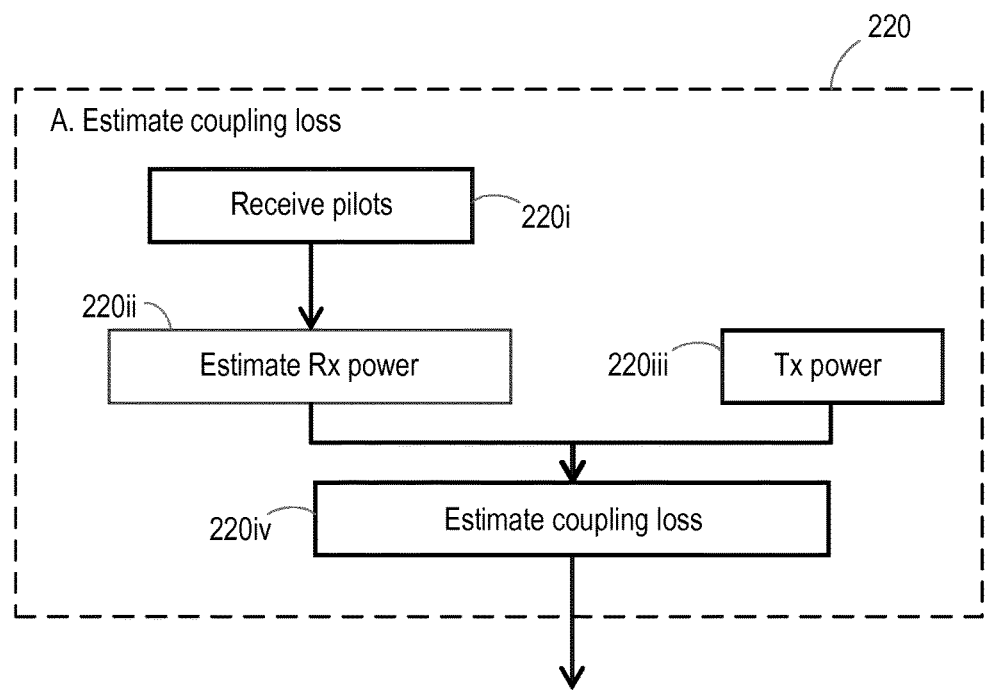
FIG. 5 is a flow chart an example of estimation of coupling loss.

FIG. 5 illustrates example sub steps which may be conducted in order to estimate the coupling loss between the MTC device and the communication network node in step 220. As noted above, the coupling loss is an example of signal loss and includes both path loss on the physical radio channel between the MTC device and communication network node, and transmit and receive signal path losses through for example the transmit and receive antennas. The coupling loss is calculated as the difference between the transmitted signal power of one node (MTC device or communication network node) and the received signal power of the other node (communication network node or MTC device). One or other of the MTC device or communication network node performs the estimation of the coupling loss.

FIG. 5 illustrates an example in which pilot signals are used for the calculation of coupling loss. In other examples, other signals or Total Received and Transmitted signal powers may be used. Referring to FIG. 5, pilot signals are received by one of the nodes in step 220*i*, and an estimate of the received signal power is made in step 220*ii*. If the coupling loss is estimated in the node receiving the pilot signals, then the received signal power is readily available in the node. If the coupling loss is estimated in the node sending the pilot signals, then the received signal power is communicated to the transmitting node from the receiving node. The transmit power is established in step 220*iii*. If the coupling loss is estimated in the node transmitting the pilot signals, then the transmit power is readily available in the node. If the coupling loss is estimated in the node receiving the pilot signals then information about the transmit power of the transmitting node is either conveyed to the receiving node by the transmitting node or the network, or the receiving node may instead use a typical transmit power. The coupling loss is then estimated as the difference between the transmitted and received signal powers in step 220*iv*.

In one example the communication network node receives uplink pilot signals from the MTC device and uses these signals to estimate a received signal power. The communication network node knows or assumes the transmit power of the MTC device, which is then used by the communication network node to estimate the coupling loss. The communication network node may know the transmit power of the MTC device from preprogramming, or through power control commands that have been transmitted by the network. In some examples the MTC device may always use the same transmit power. In other examples the network node may dictate and signal MTC device transmit power to the MTC device.

In another example the MTC device receives downlink pilot signals from the communication network node, and uses them to estimate the received signal power. The MTC device uses knowledge about the transmit power of the communication network node (for example a preset transmit power assumption, or a transmit power derived from information broadcasted or signaled by the communication network node), to estimate the coupling loss.

In the 3GPP standards for LTE, device transmission power can be controlled by the network via the cell configuration, or via device specific commands which may dictate transmission power. A communication network node may for example instruct an MTC device to transmit with a power that minimizes undesirable inter-cell interference while at the same time assuring a certain signal-to-noise-ratio at the network node receiver. As part of this procedure, the MTC device will estimate the channel coupling loss or path loss from the known downlink pilot signals and take this into account when setting the transmission power. This existing coupling loss estimate may in some examples be used as the estimating step 220 in the method 200.

In still further examples, the MTC device may estimate the received signal power based on known downlink pilots, and send this measurement to the network node, which then estimates the coupling loss. The network node may alternatively estimate the received signal power based on known UL pilots, and then send this estimate to the MTC device then estimates the coupling loss. The estimates of powers or coupling loss may be filtered or averaged over time for better accuracy.

Figure 6:
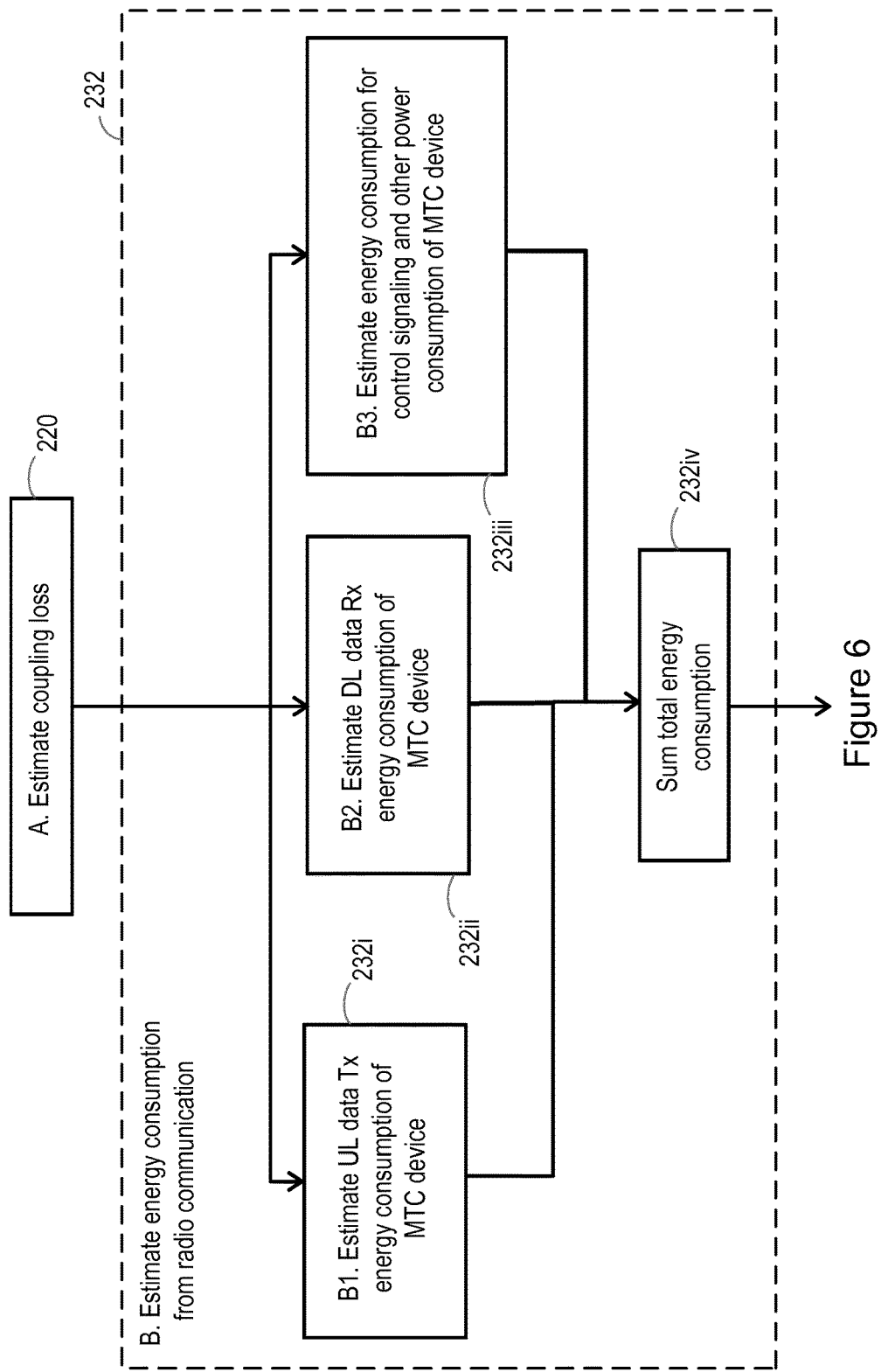
FIG. 6 is a flow chart illustrating an example of estimation of energy consumption from radio communication.

As illustrated in FIG. 4, the estimated coupling loss is mapped to an indication of remaining battery life in steps 232, 236 and 237, if data and application processing is also taken into account. FIG. 6 illustrates example sub steps which may be conducted in order to estimate energy consumption from radio communication in step 232. In some examples, the energy consumption estimation may be performed in the same node as the coupling loss estimation, but in other examples the coupling loss estimation may be communicated from the node that performed the coupling loss estimation to another node that estimates the power consumption.

As illustrated in FIG. 6, the step 232 of estimating the energy consumption caused by radio communication may be broken down into three parts 232*i*, 232*ii* and 232*iii*, which parts may then be combined, for example by summing in step 232*iv*, to arrive at the total energy consumption estimate for radio communication. In some examples only one or two of those parts may be included in the energy consumption estimation.

Figure 7:
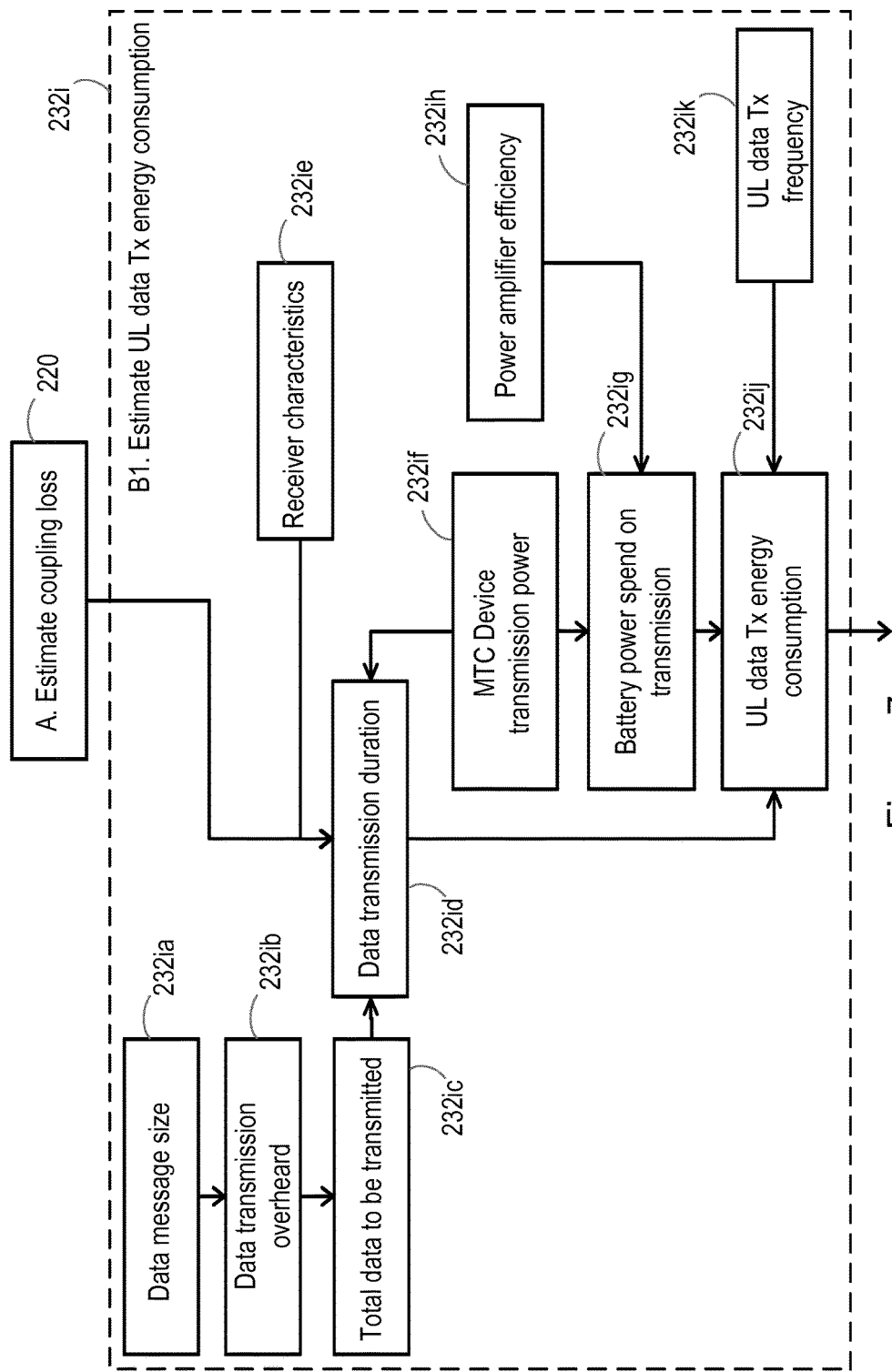
FIG. 7 is a flow chart illustrating detail of one of the steps of FIG. 6.

A first part 232*i* of the energy consumption estimation comprises estimating uplink data transmission energy consumption as illustrated in FIG. 7. Data message size is established in step 232*ia*. For many MTC applications the same data packet size is used for every transmission, for example to report a sensor or meter reading. The node performing the radio communication energy consumption estimation may therefore have knowledge about the message size, for example if the MTC device performs this estimation and the packet size is preconfigured in the device. This information may also be entered by the MTC device installer, device manager, an application manager, or a network user. Alternatively, this information may be obtained by the node performing the radio communication energy consumption estimation through the communication network via another network node.

Data transmission overhead is established in step 232*ib*. This includes the amount of extra information that needs to be appended to the message to satisfy for example higher layer protocols. The data transmission overhead is combined with the data message size in step 232*ic* to obtain the total amount of data (the total number of bits) to be transmitted during a message transmission. Receiver characteristics, including for example receiver sensitivity, are established in step 232*ie* and are combined with the device transmission power, established in step 232*if*, and the coupling loss estimate from step 220 to estimate the data rate that can be achieved at the current coupling loss. In other examples, a model of the receiver may be used to determine the possible data rate, for example the AWGN channel capacity multiplied with an impairment coefficient that reflects the loss due to practical losses from non-ideal link adaptation, coding, fading, etc. The total data to be transmitted is then combined with the estimated data rate to calculate a predicted transmission duration in step 232*id*.

Battery power spent on transmission is estimated in step 232*ig*, for example taking into account device transmission power and power amplifier efficiency, estimated in step 232*ih*. The frequency of occurrence of data message transmission is established in step 232*ik*. This may be measured for example in number of messages to be transmitted per day or per week. The transmission duration for a single message, measured for example in seconds, then is combined with the estimated battery power spent on transmission and with the frequency of occurrence of data message transmission to determine the uplink data transmission energy consumption, for example per day or per week, in step 232*ij*.

It will be appreciated that the above described calculations may in other examples be simplified, with certain steps omitted or merged. In addition, certain calculations may be performed in advance, for example a lookup table may be used to obtain the energy consumption due to uplink data transmissions directly from the coupling loss.

Figure 8:
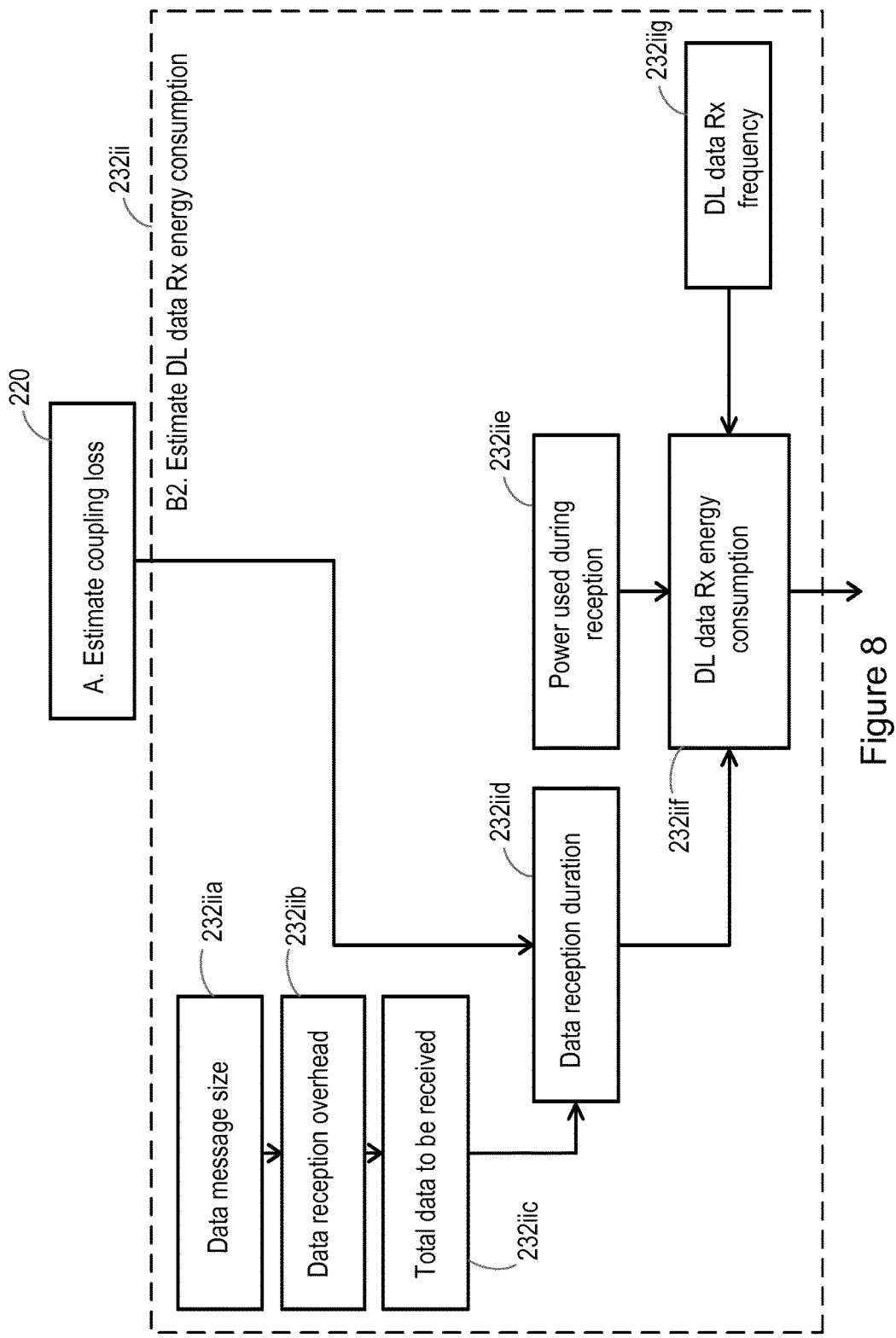
FIG. 8 is a flow chart illustrating detail of another of the steps of FIG. 6.

A second part 232*if* of the energy consumption estimation comprises estimating downlink data reception energy consumption as illustrated in FIG. 8. As in the above described process, data message size is established in step 232*iia* but in this case it is the message size of received messages. Data reception overhead is established in step 232*iib* and the total amount of data to be received is calculated by adding the message size and overhead in step 232*iic*. The time duration for data reception is calculated in step 232*iid*, in a manner analogous to that described above for transmission power estimation. Power used for reception is established in step 232*iie*. This information may be known to the node performing the reception energy consumption estimation. In some examples the estimation may be performed by the communication network node and device information of this nature may have been entered into a system database associated with the communication network. In other examples the network node may assume a typical power consumption for downlink reception. In still further examples this information may be retrieved from a device category, for example the denoted UE category in the 3GPP standard, signaled to the communication network node when the device first accesses the network prior to being scheduled for downlink data. In still further examples the energy consumption estimation may be performed in the MTC device, and the data reception energy consumption of the MTC device may be preconfigured in the MTC device.

The frequency of occurrence of reception of downlink data messages is established in step 232*iig*. As downlink data transmissions are transmitted by the communication network node, this node has full knowledge about the frequency of occurrence of these transmissions. The MTC device may also know the frequency of occurrence of reception of downlink messages, as this may be set at device manufacturing, configuration or installation time, or the MTC device may estimate frequency of occurrence based on previous downlink receptions. In further examples, the MTC device may assume a nominal frequency of occurrence.

Power used during reception and data reception duration for a message can be combined to obtain an amount of power used per message reception. This is then combined with frequency of occurrence of reception of data messages in step 232*iif* to obtain the energy consumption due to downlink data reception per day or per week.

As for the transmission energy estimation, it will be appreciated that the above described calculations may in some examples be simplified, with certain steps omitted or merged. In addition, certain calculations may be performed in advance, for example a lookup table may be used to obtain the energy consumption due to downlink data reception directly from the coupling loss.

Figure 9:
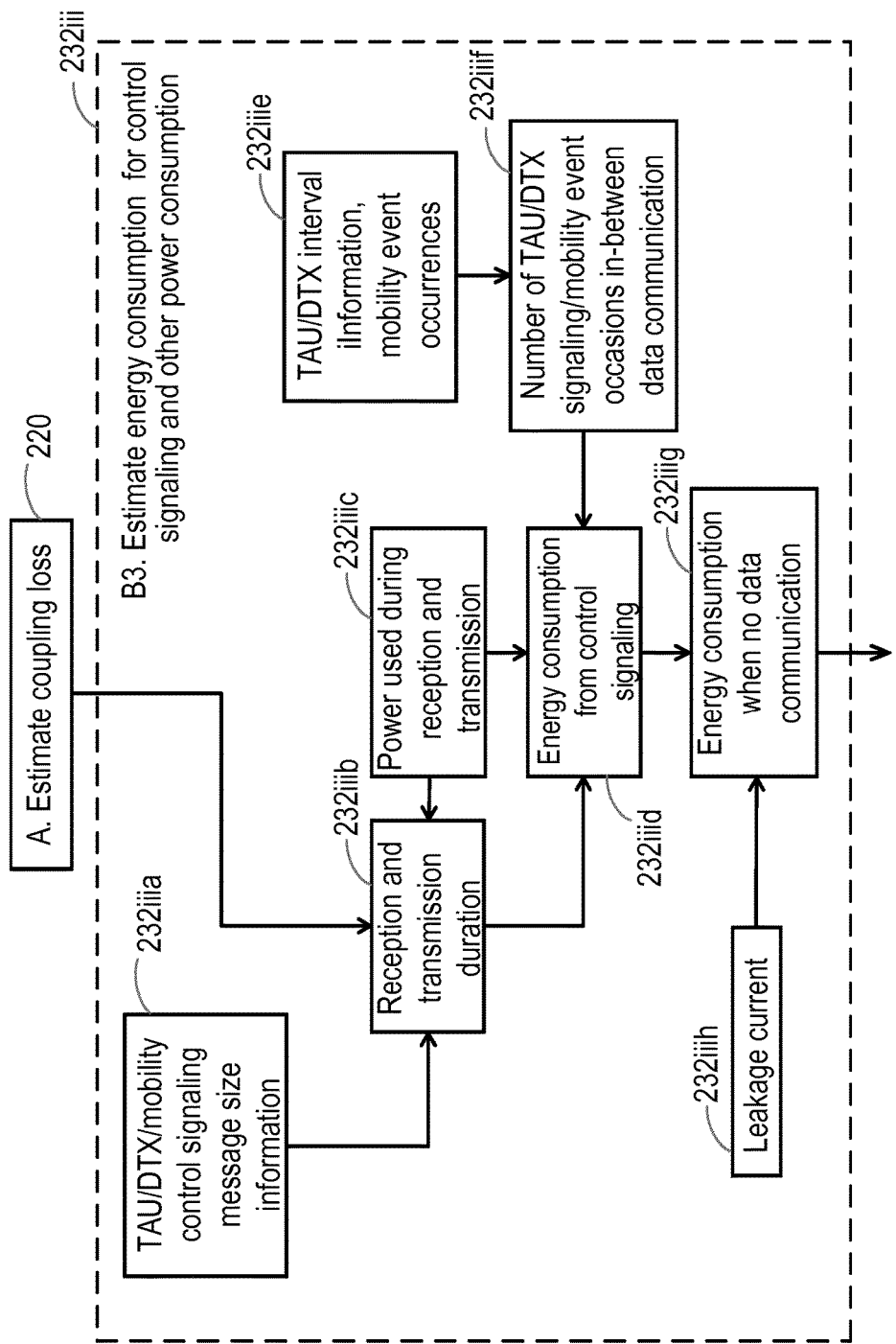
FIG. 9 is a flow chart illustrating detail of another of the steps of FIG. 6.

A third part 232*iif* of the energy consumption estimation comprises estimating energy consumption for control signaling and other power consumption as illustrated in FIG. 9. When the MTC device is not transmitting data in the uplink or receiving data in the downlink there may still be radio transmission and reception for control signaling. This may be mobility signaling, traffic area updates (TAU), or control signaling needed for discontinuous transmission and reception (DTX). TAU, DTX and mobility control signaling message size information is established in step 232*iiia*. The communication network node knows how much information needs to be transmitted and received for this kind of control signaling, so it knows how many bits need to be transmitted or received. The information can also be preconfigured in the MTC device, or the MTC device can estimate it based on signals from the network, or use assumed values. Power used for transmission and reception is established in step 232*iiic*, for example in the manner described above for parts 232*i* and 232*ii*. This information is then combined with the TAU, DTX and mobility control signaling message size information and coupling loss from step 220 to estimate the reception and transmission duration in step 232*iiib*. This duration may be combined with the power used during reception to obtain the energy consumption per control signaling message.

TAU/DTX interval information and mobility event occurrences are established in step 232*iiie*, and the number of TAU/DTX signaling and mobility event occurrences between data communication is established in step 232*iiif*. The communication network node knows the configuration of TAU cycles, DTX settings, mobility measurement settings for the device. The MTC device may also acquire this information through broadcasting or signaling from the network. The node performing the estimation of energy consumption for control signaling and other power consumption, whether it is the network node or the MTC device, can thus combine energy consumption per control signaling message with the information on TAU cycles, DTX settings, and mobility measurement settings, to estimate the energy consumption per day or per week required for control signaling in step 232*iiid*.

The node estimating energy consumption for control signaling may also have information on, or may make assumptions on, leakage currents in the MTC device, which currents cause energy consumption when the device is inactive. This information may be established in step 232*iiih* and combined with the earlier estimation of signaling energy consumption from step 232*iiid* to obtain an estimation of energy consumption when no data is being communicated in step 232*iiig*.

As for the transmission and reception energy estimations, it will be appreciated that the above described calculations may in some examples be simplified, with certain steps omitted or merged. In addition, certain calculations may be performed in advance, for example a lookup table may be used to obtain the energy consumption due to control signaling directly from the coupling loss.

Figure 10:
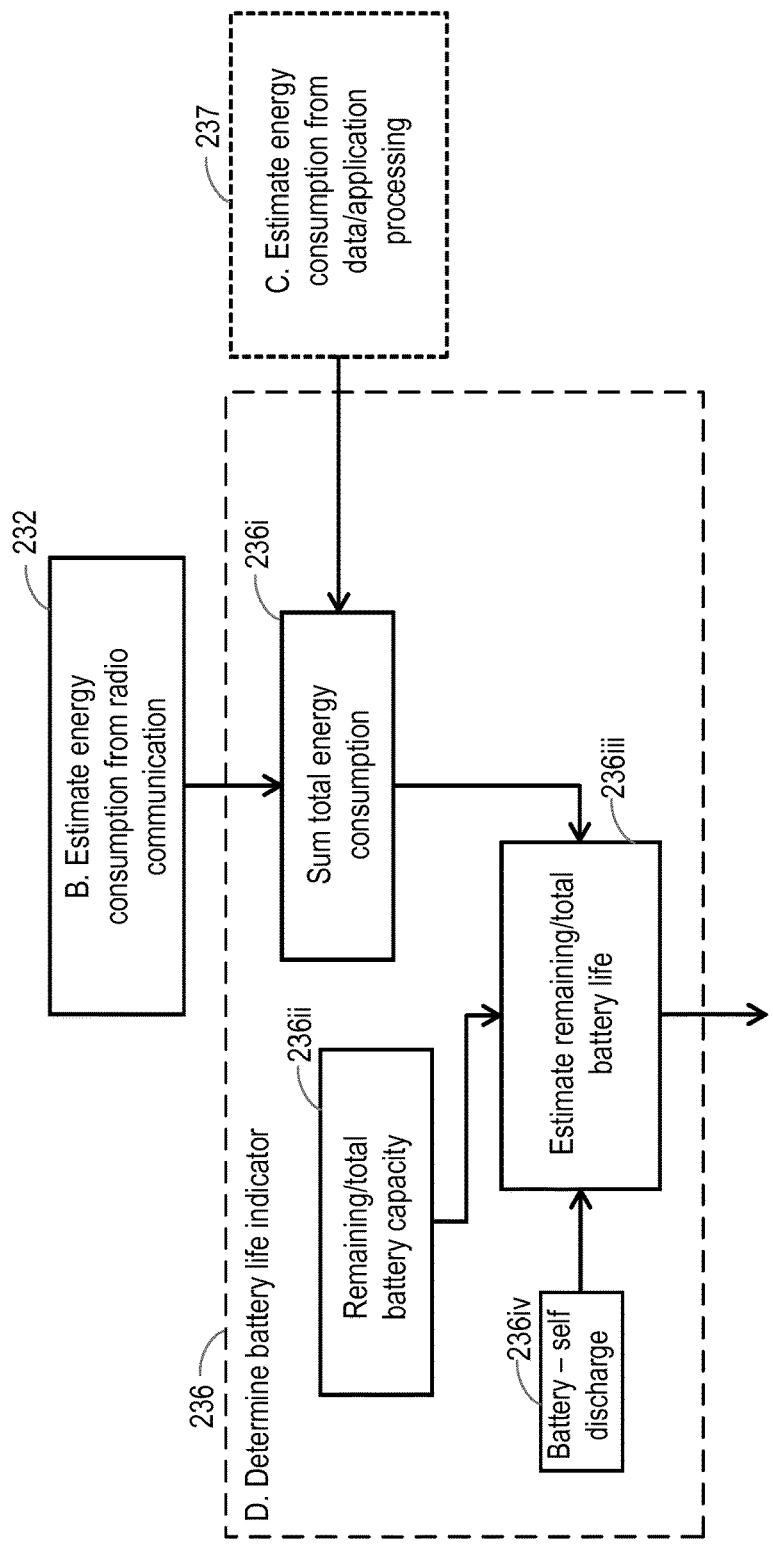
FIG. 10 is a flow chart illustrating an example of determination of a battery life indicator.

FIG. 10 illustrates steps 236 and 237 of the method 200. Step 237 comprises estimating energy consumption from data and/or application processing. In some examples this energy consumption may be assumed to be zero. In other examples, this energy consumption may be a function of the amount of data transmitted or received, and/or may be a fixed energy consumption per message transmission/reception. If used, the estimate of energy consumption from data and/or application processing may be included in the calculation of an indication of remaining battery life in step 236.

In step 236*i*, the estimate of energy consumption from data and/or application processing, if used, is combined with the estimate of energy consumption from radio communication obtained in step 232. In step 236*ii*, information on the remaining or total battery charge is established. If the method 200 is being performed at installation then the original battery charge may be used, as known by the MTC device or programmed or signaled to the communication node. If the method 200 is being performed some time after installation of the MTC device, the actual remaining battery charge may be retrieved by the MTC device and if appropriate signaled to the communication node. The remaining or total battery charge is combined with the total energy consumption in step 236*iii* to obtain an estimate of the remaining battery life, which may be the total battery life if the battery is fully charged. Battery self-discharge, obtained din step 236*iv*, may also be taken into account in this calculation. The estimate of remaining battery life may be used as the indication of remaining battery life in some examples. In other examples, the estimate of remaining battery life may be converted to a scale or a comparative indicator with reference to an earlier estimation. In still further examples, partial results of the above calculations may be used as battery life indicators. For example, some parts of the above calculations, such as the data/application processing energy consumption, may be omitted. The resulting estimate of remaining battery life will then be less accurate but may still be used as an indication of remaining battery life. For the purposes of installation guidance for example, only the relative relation of battery life indication in one potential installation location compared to another potential installation location is necessary to be able to guide an installer. In other examples the coupling loss estimate may be mapped directly to a category of battery life indicator such as "high", "medium", or "low". In this manner higher coupling loss may be translated to lower expected battery life.

Referring again to FIG. 4, the determined battery life indicator is presented to a user, installer, device manager etc in step 240. The battery life indication may be indicated directly through a display, through LEDs, through sounds, or by other means by the MTC device. Alternatively, the indication may be displayed on web page, in a system or device operation or management equipment, in a Smartphone or laptop application, via a sound through headphones or speakers or via email or SMS etc. As discussed above, the indication may be displayed as a predicted remaining battery life in days or years, or may be a quantized set of levels, such as "high", "medium", or "low" or "OK" and "low battery". In some examples, the indication may be specific to an installation guidance use case, and so may for example be: "good location" or "bad location", or may be a number on a scale for example from 1 to 5.

In some examples, the battery life indication may trigger a warning, for example if it is below a threshold level. A system operator, device installer or user may be informed that only limited battery remains and the battery needs to be replaced. In further examples, the mode of frequency of occurrence of the MTC device may be modified to preserve the remaining battery life. For example, the communication network node and MTC device may switch to a slower, more energy saving mode of communication, or the MTC device may limit the amount of information it transmits, for example by truncating bits describing a sensor measurement. The communication network node may transmit to the MTC device using repetition and BPSK to reduce the load on the MTC device receiver, or may make simpler requests to the device. In addition, the communication network node may poll the MTC device for data less often, or the MTC device may initiate communication with the network less often.

Following presentation of the indication of remaining battery life in step 240, in examples in which the method 200 is used to guide installation, a device installer may change the MTC device location or orientation in step 250. The method 200 then permits a new estimation of remaining battery life to be made for the new installation location, and a new indication of remaining battery life will be displayed. In this manner, the installer may locate the most favorable installation location from the point of view of prolonging battery life.

Some examples of the present invention may be implemented in existing networks without introducing any new reports from devices, and thus without changing any communication standard. Other examples introduce new reports enabling the calculation of a more accurate estimate of remaining battery life, or facilitating calculations in different nodes. For example, the MTC device may inform the communication network node of remaining battery charge, total battery capacity, battery type, self-discharge rate, battery energy spent per transmission, power amplifier efficiency, leakage currents, power consumption for reception and/or transmission and/or during inactive periods, etc.

In some examples, information about the MTC device or the MTC device battery is entered by a user, system operator or manager, or device installer, into a system database associated with the network. Total battery capacity, battery type, battery voltage, battery self-discharge rate, battery energy spent per transmission, power amplifier efficiency, leakage currents, power consumption for reception and/or transmission and/or during inactive periods are all examples of information that may be entered in a system database by a user, operator, manager or installer.

As discussed above, the method 200 uses the example of an MTC device in a D2AP scenario, that is where the MTC device communicates directly with a basestation or access point. This example also applies to D2D scenarios in which the master-device implements the full functionality of the communication network node. Such functionality may however result in a more complex and costly master device. It may therefore be desirable in some examples to share the functionality of the communication network node between a master device and an access point or basestation. Examples of such division of functionality are discussed below.

It may be the case that an MTC device communicates directly with a master device, which could for example be a Smartphone or another MTC device, and which in turn communicates with a basestation or access point AP. As the MTC device communication passes via the master device, estimation of coupling loss will involve to some extent the master device. In some examples, the master device may carry out the estimation of the received signal power from the MTC device transmission, for example based on uplink signals such as pilot signals received from the MTC device. This estimation may then be sent to the basestation or access point where the remaining estimation of coupling loss and mapping to an indication of remaining battery life may be carried out. This reduces the processing required of the master device. In alternative examples, the coupling loss may be estimated in the master device and then communicated to the basestation or access point for mapping to the indication of remaining battery life. In such examples the master device either has pre-programmed information concerning the transmit power of the MTC device, or the master device obtains this information from the MTC device or the basestation or access point.

In examples involving more capable MTC devices, the master node may estimate the received signal power, or the coupling loss, and may then send this information to the MTC device, where the mapping to an indication of remaining battery life may be performed.

The following example application of the above discussed methods provides an illustration of possible use cases for aspects of the present invention.

According to the example application, a battery driven MTC device is to be installed as a wireless gas meter. The MTC device has very little supplemental functionality, and consequently radio transmission dominates the battery energy consumption. The device sends a packet of 20 bytes to an access point once per hour and operates with two AA batteries. This information is entered in a system associated with the radio access network with which the MTC device communicates. During installation of the device, the access point estimates the coupling loss to the MTC device, for example by measuring the uplink pilot received signal strength and comparing it to the information it has or obtains from on the device's transmit power. Based on the coupling loss and the packet size, the access point estimates how much energy will be needed for transmission of each packet. This estimate is combined with information on the traffic pattern and the battery capacity to estimate the total battery life of the device in its current location, including its position and orientation. This information is fed back to the installer through a display on a Smartphone. The installer then adjusts the position and orientation of the device to see if the predicted battery life improves.

In a variation of the above use case, the coupling loss may be estimated by the MTC device based on downlink reference symbols sent by the access point. The MTC device then uses a lookup table that uses coupling loss and packet size as input and provides the transmission time and transmission power needed to deliver a packet as outputs. The MTC device uses the transmission time and transmission power from the lookup table, together with information about the number of packets to be transmitted per day, to calculate the energy consumption due to radio communication per day. This energy consumption is combined with a fixed daily power consumption required for other processing, leakage currents, and battery self-discharge, to predict the remaining battery life, which is then presented to the installer during installation.

Figure 11:
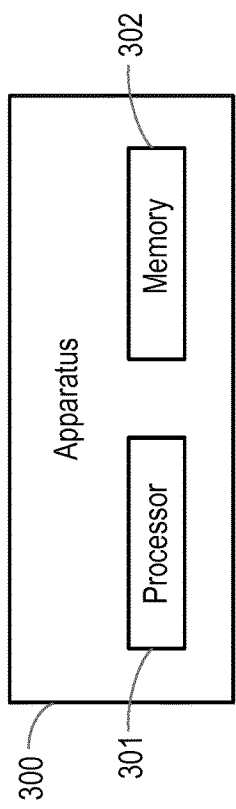
FIG. 11 is a block diagram illustrating functional units in an example apparatus.

As discussed above, the methods 100 and 200 may be implemented by a wireless device or a communication network node, or the functionality of the methods may be shared between a wireless device and a communication network node. Apparatus for performing the methods may thus be incorporated into a wireless device such as an MTC device and/or a communication network node such as a basestation, access point or other communication network node. An example apparatus 300 is illustrated in FIG. 11. The example apparatus 300 may implement the methods 100, 200 for example on receipt of suitable instructions from a computer program. Referring to FIG. 11, the apparatus 300 comprises a processor 301 and a memory 302. The memory 302 contains instructions executable by the processor 301 such that the controller node 300 is operative to conduct some or all of the steps of either or both of the methods 100, 200.

Figure 12:
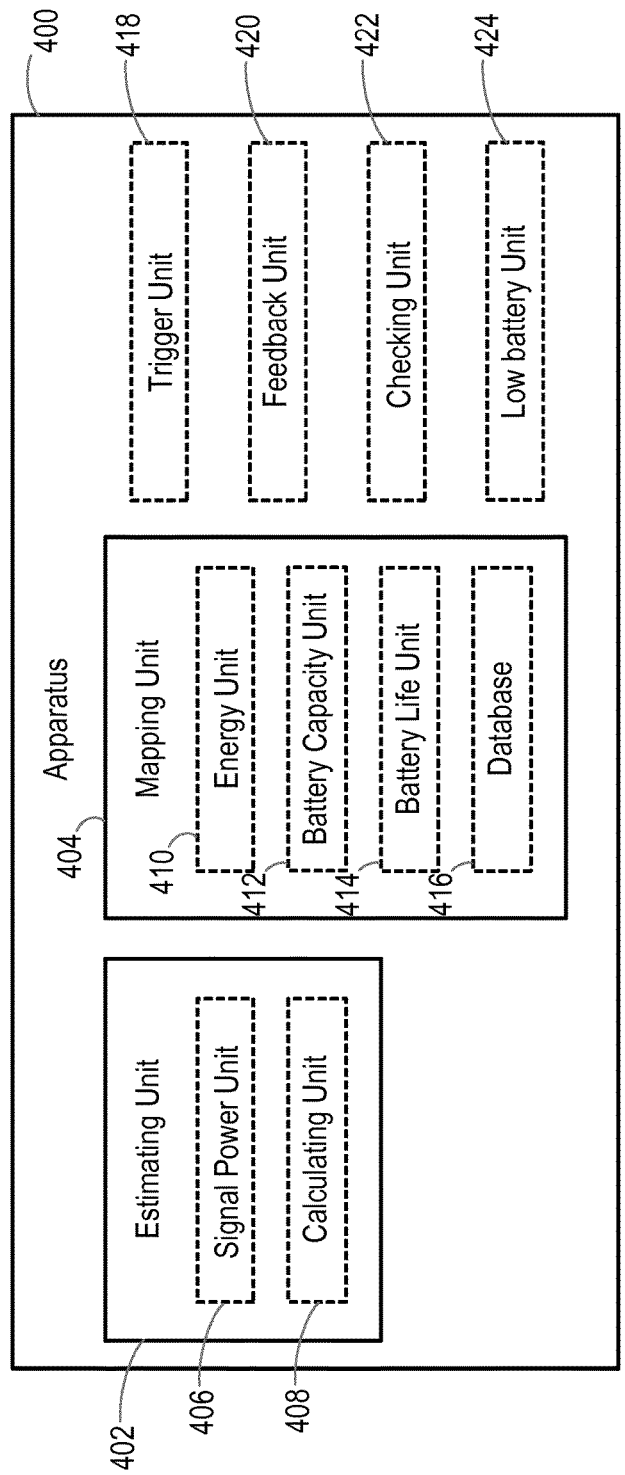
FIG. 12 is a block diagram illustrating functional units in another example of apparatus.

FIG. 12 illustrates an alternative example of an apparatus 400, which may implement the methods 100, 200 for example on receipt of suitable instructions from a computer program. It will be appreciated that the units illustrated in FIG. 12 may be realised in any appropriate combination of hardware and/or software. For example, the units may comprise one or more processors and one or more memories containing instructions executable by the one or more processors. The units may be integrated to any degree. Referring to FIG. 12, the apparatus 400 comprises an estimating unit 402 for estimating a signal loss between the wireless device in the installation location and the communication network node. The apparatus 400 also comprises a mapping unit 404 for mapping the estimated signal loss to an indication of remaining battery life for the wireless device. The mapping is based on estimated energy consumption of the wireless device for radio communication, the estimated energy consumption being generated from the estimated signal loss and determined communication parameters for the wireless device, and remaining battery capacity for the wireless device.

In some examples, the estimating unit 402 comprises a signal power unit 406 for obtaining a transmitted signal power and a received signal power of signals sent between the wireless device and the communication network node, and a calculating unit 408 for calculating a difference between the obtained transmitted and received signal powers. The signal power unit 406 may be for performing at least one of measuring a signal power, retrieving a signal power from memory, and/or receiving a signal power. The signals may be pilot signals and in some examples, the apparatus 400 further comprises a trigger unit 418 for triggering the wireless device to send pilot signals to the communication network node.

In some examples, the mapping unit 404 comprises a database unit 416 for consulting a database, the database having been populated by, for a plurality of different estimated signal losses: estimating an energy consumption of the wireless device per unit time for radio communication from the estimated signal loss and determined communication parameters for the wireless device; assuming a remaining battery capacity for the wireless device; and calculating a remaining battery life from the retrieved battery capacity and the estimated energy consumption per unit time.

In some examples, the mapping unit 404 comprises an energy unit 410 for estimating an energy consumption of the wireless device per unit time for radio communication from the estimated signal loss and determined communication parameters for the wireless device. The mapping unit 404 may further comprise a battery capacity unit 412 for retrieving a remaining battery capacity for the wireless device. The mapping unit 404 may also comprise a battery life unit 414 for calculating a remaining battery life from the retrieved battery capacity and the estimated energy consumption per unit time.

In some examples, the determined communication parameters for the wireless device may comprise at least one of an amount of data transmitted in messages from the wireless device, a frequency of occurrence of transmission of messages from the wireless device, an amount of data received in message received by the wireless device, a frequency of occurrence of receipt of messages by the wireless device, an amount of data in a control message, and/or a frequency of occurrence of control message signalling.

In some examples, the determined communication parameters for the wireless device may further comprise at least one of receiver characteristics at the communication network node and/or power amplifier efficiency at the wireless device.

In some examples, the battery life unit 414 may be for calculating a remaining battery life by dividing the remaining battery capacity by the estimated energy consumption per unit time. In further examples, the battery life unit 414 may be for calculating a remaining battery life by also estimating energy consumption of the wireless device per unit time for processing, combining the estimated energy consumption per unit time for processing with the estimated energy consumption per unit time for radio communication, and dividing the remaining battery capacity by the combined estimated energy consumption.

In some examples, the apparatus 400 further comprises a feedback unit 420 for providing the generated indication of remaining battery life to at least one of a user, operator or installer of the wireless device. The apparatus 400 may also comprise a checking unit 422 for determining that the generated indication of remaining battery life is below a threshold, and a low battery unit 424 for modifying at least one of communication or frequency of occurrence of communication between the wireless and the communication network node to conserve energy in the wireless device battery.

Aspects of the present invention thus provide methods and apparatus according to which an indication of remaining battery life may be generated, which indication is highly reactive to changes in the radio environment, and does not require any historical data, so can be generated at installation to check potential installation locations. Through aspects of the present invention, battery life can be predicted in potential installation locations and can be used to guide installation to maximize battery life. Aspects of the invention may also be used to also predict battery life after installation, potentially in combination with traditional methods of estimating historical power consumption, to more accurately predict future battery life, which can be used to plan battery replacement or charging without the need to allow for a significant margin of error and so potentially replace the battery earlier than needed.

Aspects of the invention are also able to reflect changes in remaining battery life owing to network changes such as removal or addition of access points or relaying devices. In contrast to established methods based on historical data, aspects of the present invention may substantially immediately reflect the changes to predicted battery life caused by changes to the radio environment. A user or installer may be informed of low remaining battery life, allowing for timely replacement or charging. In some examples, the information may be conveyed without the need for additional processing or display functionality at the wireless device.

The methods of the present invention may be implemented in hardware, or as software modules running on one or more processors. The methods may also be carried out according to the instructions of a computer program, and the present invention also provides a computer readable medium having stored thereon a program for carrying out any of the methods described herein. A computer program embodying the invention may be stored on a computer readable medium, or it could, for example, be in the form of a signal such as a downloadable data signal provided from an Internet website, or it could be in any other form.

It should be noted that the above-mentioned examples illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method for generating an indication of remaining battery life for a wireless device powered by a battery, the wireless device being positioned in an installation location and operable for radio communication with a communication network node, the method comprising:
    estimating a signal loss between the wireless device in the installation location and the communication network node; and
    mapping the estimated signal loss to an indication of remaining battery life for the wireless device, wherein the mapping is based on:
        an estimated energy consumption of the wireless device for radio communication, the estimated energy consumption being generated from the estimated signal loss and determined communication parameters for the wireless device; and
        a remaining battery capacity of the battery powering the wireless device.

2. The method as claimed in claim 1, wherein estimating the signal loss between the wireless device and the communication network node comprises:
    obtaining a transmitted signal power and a received signal power of signals sent between the wireless device and the communication network node; and
    calculating the signal loss based on the obtained transmitted and received signal powers.

3. The method as claimed in claim 2, wherein obtaining the transmitted or received signal power comprises at least one of:
    measuring a signal power;
    retrieving a signal power from memory; and
    receiving a signal power.

4. The method as claimed in claim 2, wherein the signals comprise at least one of uplink and downlink signals.

5. The method as claimed in claim 2, wherein the signals comprise at least one of pilot signals and reference signals.

6. The method as claimed in claim 1, further comprising triggering the wireless device to send pilot signals to the communication network node.

7. The method as claimed in claim 1, wherein mapping the estimated signal loss to an indication of remaining battery life for the wireless device comprises using the estimated signal loss to look up an estimated remaining battery life in a database that is populated with estimates of remaining battery life for different levels of signal loss and correspondingly assumed values for the remaining battery capacity of the wireless device and an energy consumption of the wireless device per unit time.

8. The method as claimed in claim 7, wherein the determined communication parameters for the wireless device comprise at least one of:
    an amount of data transmitted in messages from the wireless device;
    a frequency of occurrence of transmission of messages from the wireless device;
    an amount of data received in messages received by the wireless device;
    a frequency of occurrence of receipt of messages by the wireless device;
    an amount of data in a control message; and
    a frequency of occurrence of control message signaling.

9. The method as claimed in claim 1, wherein mapping the estimated signal loss to an indication of remaining battery life for the wireless device comprises:
    estimating the energy consumption of the wireless device per unit time for radio communication from the estimated signal loss and the determined communication parameters for the wireless device;
    retrieving a battery capacity as the remaining battery capacity for the wireless device; and
    calculating the remaining battery life from the retrieved battery capacity and the estimated energy consumption per unit time.

10. The method as claimed in claim 9, wherein the determined communication parameters for the wireless device comprise at least one of:
    an amount of data transmitted in messages from the wireless device;
    a frequency of occurrence of transmission of messages from the wireless device;
    an amount of data received in messages received by the wireless device;
    a frequency of occurrence of receipt of messages by the wireless device;
    an amount of data in a control message; and
    a frequency of occurrence of control message signaling.

11. The method as claimed in claim 10, wherein the determined communication parameters for the wireless device comprise at least an amount of data transmitted in messages from the wireless device and a frequency of occurrence of transmission of messages from the wireless device, and wherein the determined communication parameters for the wireless device further comprise at least one of:
  receiver characteristics at the communication network node; and
  a power amplifier efficiency at the wireless device.

12. The method as claimed in claim 7, wherein calculating the remaining battery life comprises dividing the remaining battery capacity by the estimated energy consumption per unit time.

13. The method as claimed in claim 12, wherein calculating the remaining battery life further comprises:
  estimating an energy consumption of the wireless device per unit time for processing;
  combining the estimated energy consumption per unit time for processing with the estimated energy consumption per unit time for radio communication; and
  dividing the remaining battery capacity by the combined estimated energy consumption.

14. The method as claimed in claim 1, further comprising providing the indication of remaining battery life to at least one of a user, operator and installer of the wireless device.

15. The method as claimed in claim 1, further comprising:
  determining that the indication of remaining battery life is below a threshold; and
  modifying at least one of communication or frequency of occurrence of communication between the wireless device and the communication network node to conserve energy in the battery powering the wireless device.

16. The method as claimed in claim 1, wherein the wireless device comprises a Machine Type Communication (MTC) device.

17. The method of claim 1, wherein the method comprises obtaining a battery capacity as the remaining battery capacity used for estimating the remaining battery life, an estimate of the actual remaining battery capacity of the battery powering the wireless device, or using, as the remaining battery capacity used for estimating the remaining battery life, an assumed remaining battery capacity of the battery powering the wireless device.

18. A non-transitory computer readable medium storing a computer program comprising computer instructions that, when executed by at least one processor of an apparatus for generating an indication of remaining battery life for a wireless device powered by a battery and positioned in an installation location and operable for radio communication with a communication network node, configures the processor to:
  estimate a signal loss between the wireless device in the installation location and the communication network node; and
  map the estimated signal loss to an indication of remaining battery life for the wireless device, wherein the mapping is based on:
    an estimated energy consumption of the wireless device for radio communication, the estimated energy consumption being generated from the estimated signal loss and determined communication parameters for the wireless device; and
    a remaining battery capacity of the battery powering the wireless device.

19. An apparatus for generating an indication of remaining battery life for a wireless device powered by a battery, the wireless device being positioned in an installation location and operable for radio communication with a communication network node, the apparatus comprising:
  processing circuitry; and
  a memory containing instructions executable by the processing circuitry, such that the processing circuitry is configured to:
    estimate a signal loss between the wireless device in the installation location and the communication network node; and
    map the estimated signal loss to an indication of remaining battery life for the wireless device, wherein the mapping is based on:
      an estimated energy consumption of the wireless device for radio communication, the estimated energy consumption being generated from the estimated signal loss and determined communication parameters for the wireless device; and
      a remaining battery capacity of the battery powering the wireless device.

20. The apparatus as claimed in claim 19, wherein the memory contains instructions such that the processing circuitry is configured to:
  obtain a transmitted signal power and a received signal power of signals sent between the wireless device and the communication network node; and
  calculate a difference between the obtained transmitted and received signal powers.

21. The apparatus as claimed in claim 20, wherein the memory contains instructions such that the processing circuitry is configured to perform at least one of:
  measuring a signal power;
  retrieving a signal power from memory; and
  receiving a signal power.

22. The apparatus as claimed in claim 20, wherein the signals comprise at least one of pilot signals and reference signals.

23. The apparatus as claimed in claim 19, wherein the memory contains instructions such that the processing circuitry is configured to trigger the wireless device to send pilot signals to the communication network node.

24. The apparatus as claimed in claim 19, wherein the memory contains instructions such that the processing circuitry is configured to map the estimated signal loss to an indication of remaining battery life for the wireless device by using the estimated signal loss to look up an estimated remaining battery life in a database that is populated with estimates of remaining battery life for different levels of signal loss and correspondingly assumed values for the remaining battery capacity of the wireless device and an energy consumption of the wireless device per unit time.

25. The apparatus as claimed in claim 24, wherein the determined communication parameters for the wireless device comprise at least one of:
  an amount of data transmitted in messages from the wireless device;
  a frequency of occurrence of transmission of messages from the wireless device;
  an amount of data received in messages received by the wireless device;
  a frequency of occurrence of receipt of messages by the wireless device;
  an amount of data in a control message; and
  a frequency of occurrence of control message signaling.

26. The apparatus as claimed in claim 19, wherein the memory contains instructions such that the processing circuitry is configured to:

estimate the energy consumption of the wireless device per unit time for radio communication from the estimated signal loss and the determined communication parameters for the wireless device;

retrieve a battery capacity as the remaining battery capacity for the wireless device; and calculate the remaining battery life from the remaining battery capacity and the estimated energy consumption per unit time.

27. The apparatus as claimed in claim 26, wherein the determined communication parameters for the wireless device comprise at least one of:

an amount of data transmitted in messages from the wireless device;

a frequency of occurrence of transmission of messages from the wireless device;

an amount of data received in messages received by the wireless device;

a frequency of occurrence of receipt of messages by the wireless device;

an amount of data in a control message; and a frequency of occurrence of control message signaling.

28. The apparatus as claimed in claim 27, wherein the determined communication parameters for the wireless device comprise at least an amount of data transmitted in messages from the wireless device and a frequency of occurrence of transmission of messages from the wireless device, and wherein the determined communication parameters for the wireless device further comprise at least one of:

receiver characteristics at the communication network node; and a power amplifier efficiency at the wireless device.

29. The apparatus as claimed in claim 26, wherein the memory contains instructions such that the processing circuitry is configured to calculate the remaining battery life by dividing the remaining battery capacity by the estimated energy consumption per unit time.

30. The apparatus as claimed in claim 28, wherein the memory contains instructions such that the processing circuitry is configured to calculate the remaining battery life by also:

estimating an energy consumption of the wireless device per unit time for processing;

combining the estimated energy consumption per unit time for processing with the estimated energy consumption per unit time for radio communication; and dividing the remaining battery capacity by the combined estimated energy consumption.

31. The apparatus as claimed in claim 19, wherein the memory contains instructions such that the processing circuitry is configured to provide the indication of remaining battery life to at least one of a user, operator and installer of the wireless device.

32. The apparatus as claimed in claim 19, wherein the memory contains instructions such that the processing circuitry is configured to:

determine that the indication of remaining battery life is below a threshold; and modify at least one of communication or frequency of occurrence of communication between the wireless device and the communication network node to conserve energy in the battery powering the wireless device.

33. The apparatus as claimed in claim 19, wherein the wireless device comprises a Machine Type Communication (MTC) device.

34. The apparatus as claimed in claim 19, wherein the apparatus is distributed between the wireless device and the communication network node.

35. The apparatus as claimed in claim 19, wherein the apparatus is or is in the wireless device.

36. The apparatus as claimed in claim 19, wherein the apparatus is or is in the communication network node.

* * * * *